United States Patent [19]

Tanaka

[11] Patent Number: 4,734,574

[45] Date of Patent: Mar. 29, 1988

[54] LIGHT-PROJECTING AND-RECEIVING UNIT FOR USE IN A HUMAN BODY DETECTING APPARATUS FOR AUTOMATIC DOORS

[75] Inventor: Tamotsu Tanaka, Kurobe, Japan

[73] Assignee: Yoshida Kogyo K. K., Tokyo, Japan

[21] Appl. No.: 942,819

[22] Filed: Dec. 17, 1986

[30] Foreign Application Priority Data

Dec. 26, 1985 [JP] Japan .............................. 60-199078[U]

[51] Int. Cl.⁴ .............................................. G08B 13/18
[52] U.S. Cl. ..................................... 250/221; 340/556; 340/567; 350/613
[58] Field of Search ................ 250/221; 340/555, 556, 340/565, 567; 350/612, 613, 614

[56] References Cited

U.S. PATENT DOCUMENTS 4,263,585  4/1981  Schaefer ............................. 250/221
4,310,836  1/1982  Stanzani ............................. 250/221

Primary Examiner—Edward P. Westin
Attorney, Agent, or Firm—Hill, Van Santen, Steadman & Simpson

[57] ABSTRACT

A light projecting and receiving unit for use in a human body detecting apparatus having a light projecting section consisting of at least one set of concave mirrors and a plurality of light projecting elements, and a light receiving section consisting of at least one set of concave mirrors and a plurality of light receiving elements. The light projecting section and the light receiving section are formed on one side surface of a generally rectangular unit body, and the unit body is divided longitudinally into one and the other sides by a partition wall located at the longitudinal central part of the unit body and projecting vertically therefrom as an integral part thereof. Further, each of the split concave mirror sets consists of a combination of a plurality of concave mirrors oriented in different directions and arranged sequentially in the longitudinal direction of the unit body so as to have a common or the same focus.

9 Claims, 7 Drawing Figures

ABOUT THIS PATENT

LIGHT-PROJECTING AND-RECEIVING UNIT FOR USE IN A HUMAN BODY DETECTING APPARATUS FOR AUTOMATIC DOORS

BACKGROUND OF THE INVENTION

1. Technical Field

This invention relates to a light projecting and receiving unit for use in a human body detecting apparatus for automatic door, and more particularly to a light projecting and receiving unit having a light projecting section and a light receiving section, each of the sections consisting of a plurality of split concave mirrors combined with one another to have a common or the same focus.

2. Description of the Prior Art

As for the human body detecting apparatus for use in automatic doors, there has so far been known and employed an active type human body detector apparatus adapted to detect the entry of the human body into the human body detection range by allowing the light beams projected by a light projector and reflected by the human body to be received by a light receiver.

Regarding a light projector and a light receiver for use in such a human body detector apparatus, a combination of concave mirrors with light projecting elements and concave mirrors with light receiving elements has been known, which is arranged such that the light beams emanated by the light projecting elements having a low photo-output can be irradiated as spot light beams of acute directional property, and the light beams reflected by the human body when subjected to the spot light can be detected by the light receiving elements.

In the above-mentioned publicly known prior art light projector and light receiver, the human body detection range is determined by the range of irradiation of spot light emanated by the light projector, i.e., the number of the spot light beams. Therefore, in order to obtain a wide range of detection of the human body, a multiplicity of spot light beams are required so that provision of a large number of combinations of light projecting elements with concave mirrors as well as the corresponding number of combinations of light receiving elements with concave mirrors is necessarily required. Accordingly, both the light projector and the light receiver become large-sized, thus increasing the manufacturing cost thereof and the space required for installation thereof. These are disadvantages in the previously produced active type human body detection apparatus.

SUMMARY OF THE INVENTION

The present invention has been contemplated and devised to eliminate the above-mentioned disadvantage in the prior art active type human body detecting apparatus, and has for its object to provide a human body detecting apparatus, having a light projecting section consisting of a set of split concave mirrors and a plurality of light projecting elements, and a light receiving section consisting of at least one set of split concave mirrors and a plurality of light receiving elements, and arranged such that spot light beams equivalent in number to a product of the number of the concave mirrors and that of the light projecting elements in the light projecting section can be irradiated.

Another object of the present invention is to provide a human body detecting apparatus whereby a wide human body detection range can be obtained.

A further object of the present invention is to provide a human body detecting apparatus which requires less space for installation.

A still further object of the present invention is to provide a human body detecting apparatus which can be manufactured at a low cost.

To achieve the above-mentioned objects, in accordance with the first aspect of the present invention, there is provided a human body detecting apparatus, characterized in that it comprises a light projecting section consisting of at least one set of split concave mirrors and a plurality of light projecting elements, and a light receiving section consisting of at least one set of split concave mirrors and a plurality of light receiving elements; the light projecting section is arranged such that it can irradiate spot light beams equivalent in number to a product of the number of the concave mirrors and that of the light projecting elements; and the light receiving section is arranged such that it can receive at least the number of the spot light beams irradiated by the light projecting section.

According to the second aspect of the present invention, there is provided a human body detecting apparatus, characterized in that each of the sets of concave mirror sets as set forth in the first aspect consists of a plurality of concave mirrors combined with one another so as to have a common or the same focus.

According to the third aspect of the present invention, there is provided a human body detecting apparatus, characterized in that the light projecting elements and the light receiving elements as set forth in the first aspect are installed in vicinity of the focuses of their respective sets of split concave mirrors.

According to the fourth aspect of the present invention, there is provided a light projecting and receiving unit for use in a human body detecting apparatus, comprising a unit body comprised of a substantially rectangular member; two side walls formed integrally with the unit body at both the longitudinal ends thereof and projecting vertically from the surface of the unit body and in parallel relationship with each other; a partition wall formed integrally with the unit body at the longitudinal central part thereof and projecting vertically from the surface of the unit body and in opposed and parallel relationship with the side walls; a first light projecting section and a second light projecting section formed on one side of the surface of the unit body divided by the partition wall, each of the first and second light projecting sections being a split concave mirror set comprised of a plurality of parabolic concave mirrors arranged so as to have common or the same focuses, respectively; a first light receiving section and a second light receiving section formed on the other side of the surface of the unit body divided by the partition wall, each of the first and second light receiving sections being a split concave mirror set comprised of a plurality of parabolic concave mirrors arranged so as to have common or the same focuses, respectively; a light shielding plate located vertically along the whole longitudinal length of the unit body at the substantially transverse central part thereof in such a manner as to divide the unit body into the first and second light projecting sections, and the first and second light receiving sections, respectively, the light shielding plate being fitted in the surface of the unit body as an integral part thereof at right angles to the side walls and the partition wall; a light projecting element mounting member mounted on the light shielding plate so as to locate a plurality of light projecting elements in the vicinity of each of the focuses of the split concave mirror sets in the light projecting section; and a light receiving element mounting member mounted on the light shielding plate so as to locate a plurality of light receiving elements in the vicinity of each of the focuses of the split concave mirror sets in the light receiving section.

According to the fifth aspect of the present invention, there is provided a light projecting and receiving unit, characterized in that each of the split concave mirror sets of the first light projecting section and the first light receiving section, respectively, in the light projecting and receiving unit as set forth in the fourth aspect consists of a combination of three parabolic concave mirrors arranged sequentially in the longitudinal direction of the unit body, and each of the central concave mirrors is formed to incline more sideways and outward than the two concave formed on both sides thereof.

According to the sixth aspect of the present invention, there is provided a light projecting and receiving unit, characterized in that each of the split concave mirror sets of the second light projecting section and the light receiving section in the light projecting and receiving unit as set forth in the fourth aspect consists of a combination of two parabolic concave mirrors arranged sequentially in the longitudinal direction of the unit body.

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

DETAILED DESCRIPTION OF THE INVENTION

Figure 1:
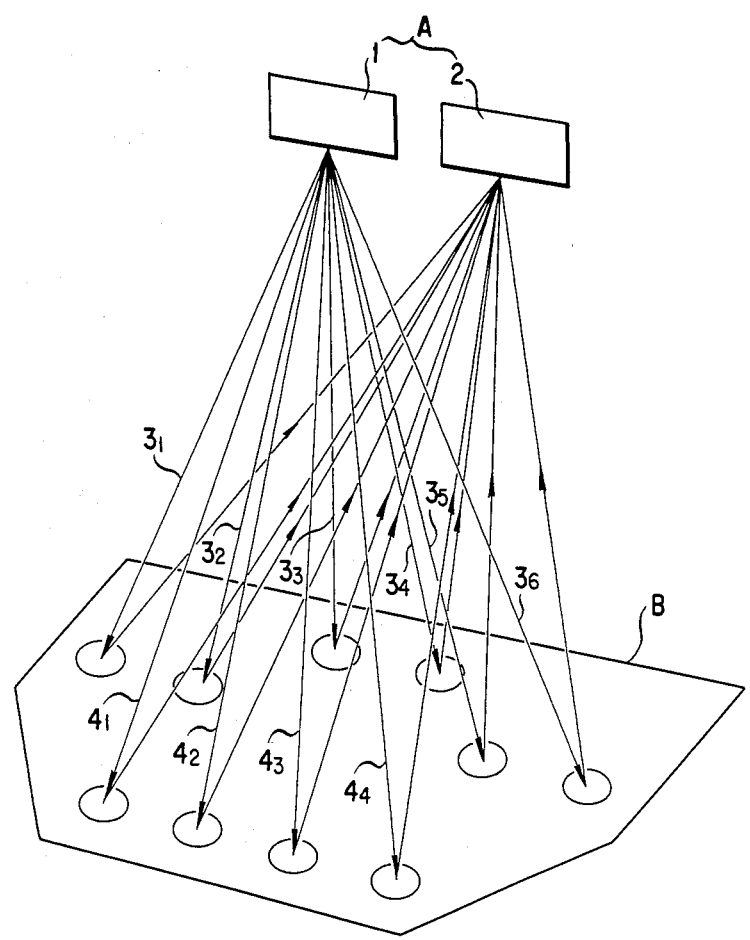
FIG. 1 is a schematic explanatory view of a human body detecting apparatus according to the present invention.

FIG. 1 is a schematic explanatory view of the human body detecting apparatus according to the present invention. As is obvious from FIG. 1, the human body detecting apparatus of the present invention comprises a light projecting and receiving unit "A" including a light projecting section 1 and a light receiving section 2. The arrangement is made such that spot light beams $3_1$, $3_2$, $3_3$, $3_4$, $3_5$ and $3_6$, and $4_1$, $4_2$, $4_3$, $4_4$ are irradiated by the light projecting section 1, and the spot light beams reflected by the human body are received by the light receiving section 2 so as to detect the presence of the human body.

The human body detecting apparatus is adapted to be provided at an entrance and exit door for a building etc., and particularly above the front and rear of a sliding door. However, in FIG. 1, there is shown a detecting apparatus provided on either one of the entrance and exit of a door.

As mentioned above, according to the human body detecting apparatus of the present invention, a great many spot light beams can be produced, and the range of irradiation of spot light beams spreads in all directions, i.e., the front and rear, and the left and right of the apparatus as shown in FIG. 1. Stating in more detail, the human body detection range "B" is a region which overlaps the light receiving spot for the light receiving section 2 in the light spot irradiation range.

The light projecting and receiving unit "A" for use in the human body detecting apparatus according to the present invention will now be described with reference to FIGS. 2 to 6.

Figure 2:
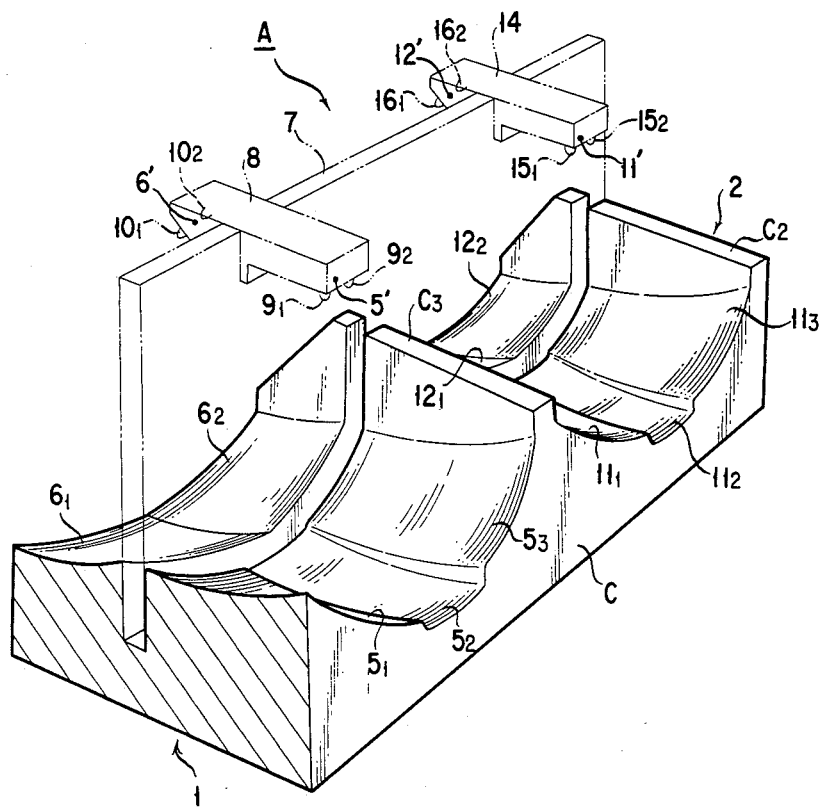
FIG. 2 is a schematic perspective view of a light projecting and receiving unit for use in the human body detecting apparatus according to the present invention.

As shown by a schematic perspective view in FIG. 2, the light projecting and receiving unit "A" has a generally rectangular-shaped unit body "C" and two side walls $C_1$ and $C_2$ formed integrally with the unit body "C" at both the longitudinal ends thereof and projecting vertically from the unit body "C" and in parallel relationship with each other. (But, in FIG. 2, the side wall $C_1$ is not shown.) Further, a partition wall $C_3$ is formed integrally with the unit body "C" in the longitudinal central part thereof and in opposed parallel relationship with the side walls $C_1$ and $C_2$, and projects vertically from the unit body "C". A light projecting section 1 is provided between the partition wall $C_3$ and the side walls $C_1$, whilst, a light receiving section 2 is provided between the partition wall $C_3$ and the side wall $C_2$. Further, installed in the substantially transverse central part of the unit body "C" is a light shielding plate 7 which extends along the whole length of the unit body "C" and fitted integrally and vertically in the unit body "C" right angles to the side walls $C_1$ and $C_2$ and the partition wall $C_3$. The light shielding plate 7 divides the light projecting section 1 into the first and second light projecting sections, and the light receiving section 2 into the first and second light receiving sections.

The first light projecting section in the light projecting section 1 is formed by a three-split concave mirror set comprised of a first concave mirror $5_1$, a second concave mirror $5_2$ and a third concave mirror $5_3$ arranged sequentially in the longitudinal direction of the unit body "C" so as to have a common or the same focus 5'. Whilst, the second light projecting section is formed by a two-split concave mirror set comprised of a fourth concave mirror $6_1$ and a fifth concave mirror $6_2$ arranged sequentially in the longitudinal direction of the unit body "C" so as to have a common or the same focus 6'.

The second concave mirror $5_2$ in the three-split concave mirror set formed in the first light projecting section is formed to incline more sideways and outward of the unit body "C" than the concave mirrors $5_1$ and $5_3$ formed on both sides thereof.

Whilst, the light receiving section 2 is constructed in like manner. Stating in more detail, the first light receiving section is formed by a three-split concave mirror set comprised of a sixth concave mirror $11_1$, a seventh concave mirror $11_2$ and a eight concave mirror $11_3$ arranged sequentially in the longitudinal direction of the unit body "C" so as to have one and the same focus $11'$. The second light receiving section is formed by a two-split concave mirror set comprised of a ninth concave mirror $12_1$ and a tenth concave mirror set $12_2$ arranged sequentially in the longitudinal direction of the unit body "C" so as to have one and the same focus $12'$.

Moreover, the seventh concave mirror $11_2$ in the three-split concave mirror set formed in the first light receiving section is formed to incline more sideways and outward of the unit body "C" than the concave mirrors $11_1$ and $11_3$ formed on both sides thereof.

Further, mounted on the above-mentioned light shielding plate 7 on the side of the light projecting section 1 is a light projecting element mounting member 8 having a first, a second, a third and a fourth light projecting elements $9_1$, $9_2$ and $10_1$, $10_2$ mounted, respectively, in the vicinity of the focuses $5'$ and $6'$ of the three-split concave mirror set and the two-split concave mirror set, respectively. Mounted, in like manner, on the light shielding plate 7 on the light receiving section 2 is a light receiving element mounting member 14 having a first, a second, a third and a fourth light receiving elements $15_1$, $15_2$ and $16_1$, $16_2$ mounted, respectively, in the vicinity of the focuses $11'$ and $12'$ of the three-split concave mirror set and the two-split concave mirror set, respectively.

Figure 3:
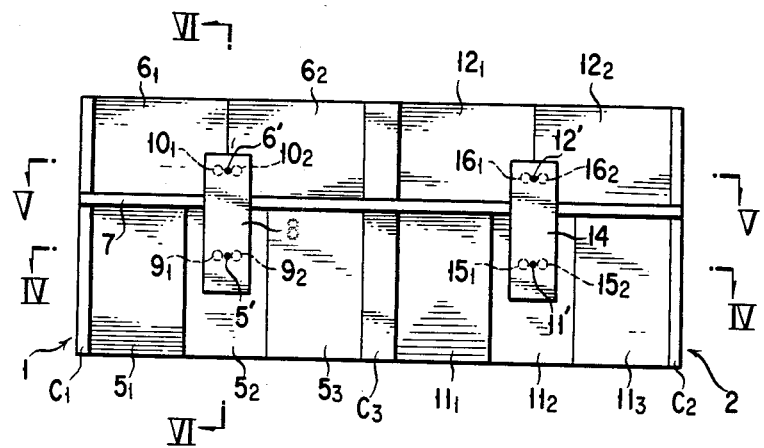
FIG. 3 is a plan view of the light projecting and receiving unit shown in FIG. 2.
Figure 4:
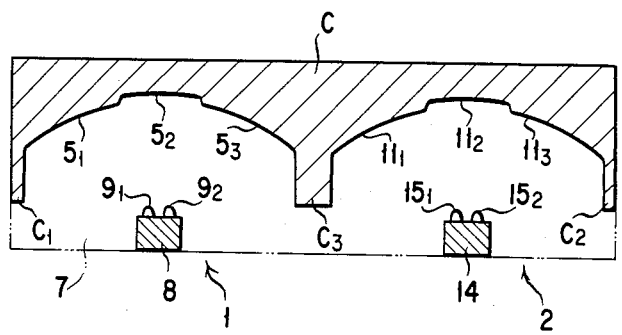
FIG. 4 is a sectional view taken along the line IV—IV in FIG. 3.
Figure 5:
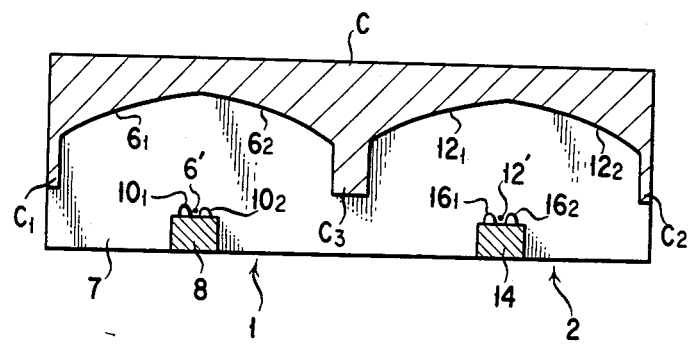
FIG. 5 is a sectional view taken along the line V—V in FIG. 3.
Figure 6:
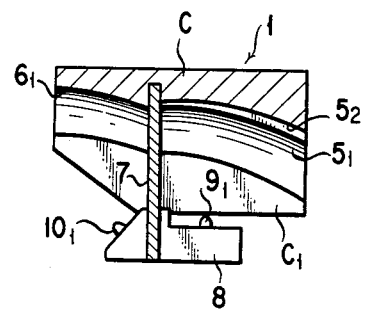
FIG. 6 is a sectional view taken along the line VI—VI in FIG. 3.

Further, FIG. 3 is a plan view of the light projecting and receiving unit "A" shown in FIG. 2, and FIGS. 4, 5 and 6 are sectional views taken along lines IV—IV, V—V and VI—VI, respectively, in FIG. 2.

Moreover, each of the concave mirrors should preferably have a parabolic surface, and is formed by cutting an aluminium material into the unit body "C" and then subjecting it to a mirror surface finish or alternatively by subjecting the surface of the unit body "C" molded from acrylic resin to vapor-deposition of an aluminium film.

The operation of the light projecting and receiving unit "A" constructed as mentioned hereinabove according to the present invention will now be described below.

As shown in FIG. 1, the light beams emanated by the first and second light projecting elements $9_1$ and $9_2$ are focused by the first, second and third concave mirrors $5_1$, $5_2$ and $5_3$ in the split concave mirror set of the first light projecting section and then reflected to form spot light rows $3_1$ to $3_6$, whilst the light beams projected by the third and fourth light projecting elements $10_1$ and $10_2$ are focused by the fourth and fifth concave mirrors $6_1$ and $6_2$ in the split concave mirror set of the second light projecting section and then reflected to form spot light rows $4_1$ to $4_4$. Further, out of the spot light rows $3_1$ to $3_6$, the spot light beams $3_3$ and $3_4$ produced by the second concave mirror $5_2$ is nearer the door "D" than the other spot light beams $3_1$, $3_2$, $3_5$ and $3_6$ as is obvious from FIG. 7, since the second concave mirror $5_2$ is formed to incline more sideways and outward of the body than the other concave mirrors $5_1$ and $5_3$.

When the spot light beams emanated by the light projecting section 1 impinge on the human body which approached the door "D", as shown in FIG. 1, the light beams reflected by the human body when subjected to the spot light beams $3_1$ to $3_6$ are allowed to be incident on the first and second light receiving elements $15_1$ and $15_2$, respectively, through the concave mirrors $11_1$ and $11_2$ in the split concave mirror set of the first light receiving section, whilst the light beams reflected by the human body when subjected to the spot light beams $4_1$ to $4_4$ are allowed to be incident on the third and fourth light receiving elements $16_1$ and $16_2$, respectively, through the concave mirror sets $12_1$ and $12_2$ in the split concave mirror set of the second light receiving section.

When the respective light receiving elements $15_1$, $15_2$ and $16_1$ and $16_2$ detect the reflective light beams from the human body, a door control device, not shown, is actuated to open the door "D".

In view of the forgoing description, according to the light projecting and receiving unit of the present invention, spot light beams which are equivalent in number to a product of the number of the concave mirrors and that of the light projecting elements provided in the light projecting section 1 can be irradiated, and therefore many spot light beams can be produced by means of a combination of a less number of light projecting elements and a compact set of split concave mirrors. Moreover, the reflective light beams from the human body when approaching the door can be received in like manner by means of a combination of a less number of light receiving elements and a compact set of split concave mirrors. Thus, by using this small-sized light projecting and receiving unit which require less space for installation, a wide human body detection range "B" can be obtained and the manufacturing cost of the unit can be reduced significantly.

Figure 7:
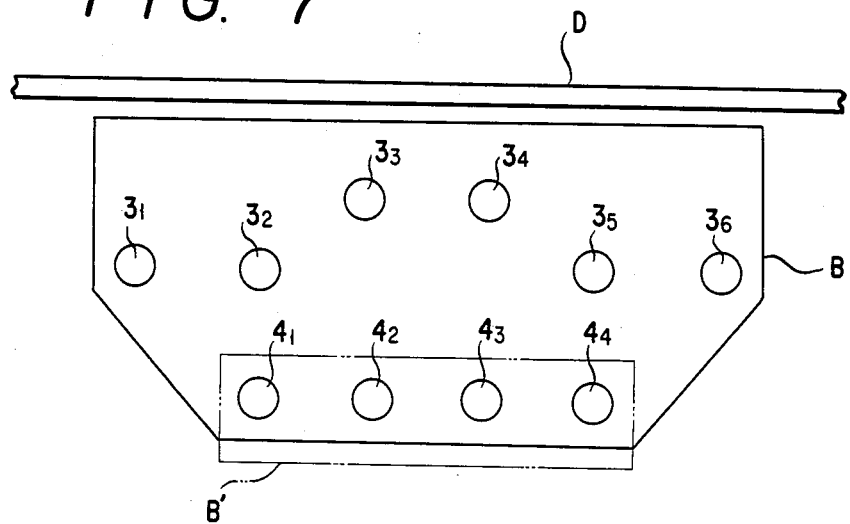
FIG. 7 is a plan view of the region of detection of the human body obtained by the human body detecting apparatus according to the present invention.

Further, as shown in FIG. 7, according to the light projecting and receiving unit of the present invention, spot light beams can be irradiated to both the spot near the door "D" and that away from the door "D". Therefore, if for example the first and second light projecting elements $9_1$ and $9_2$, and the third and fourth light projecting elements $10_1$ and $10_2$ are provided independently with each other and arranged to be turned ON and OFF, respectively, by means of switches, not shown, both the wide human body detection range "B" and the narrow human body detection range "B'" can be obtained separately.

Further, it is needless to say that, if the arrangement of the first and second light projecting sections is reversed, then the arrangement of the spot light rows $3_1$ to $3_6$ and the spot light rows $4_1$ to $4_4$ can be reversed. In this case, the first and second light receiving sections in the light receiving section 2 need to be reversely arranged.

It is to be understood that the foregoing description is merely illustrative of a preferred embodiment of the present invention, and that the present invention is not to be limited thereto, but is to be determined by the scope of the appended claims.

What is claimed is:

1. A human body detecting apparatus, characterized in that it comprises a light projecting section consisting of at least one set of split concave mirrors and a plurality of light projecting elements, and a light receiving section consisting of at least one set of split concave mirrors and a plurality of light receiving elements; said light projecting section is arranged such that it can irradiate spot light beams equivalent in number to a product of the number of the concave mirrors and that of the light projecting elements; and said light receiving section is arranged such that it can receive at least the number of the spot light beams irradiated by the light projecting section.

2. The human body detecting apparatus as claimed in claim 1, characterized in that each of said sets of split concave mirrors consists of a plurality of concave mirrors combined with one another so as to have a common or the same focus.

3. The human body detecting apparatus as claimed in claim 1, characterized in that the light projecting elements and the light receiving elements are installed in the vicinity of the focuses of their respective sets of split concave mirrors.

4. A light projecting and receiving unit for use in a human body detecting apparatus, comprising a unit body comprised of a substantially rectangular member; two side walls formed integrally with the unit body at both the longitudinal ends thereof and projecting vertically from the surface of the unit body and in parallel relationship with each other; a partition wall formed integrally with the unit body at the longitudinal central part thereof and projecting vertically from the surface of said unit body and in opposed and parallel relationship with side side walls; a first light projecting section and a second light projecting section formed on one side of the surface of the unit body divided by the partition wall, each of the first and second light projecting sections being a split concave mirror set comprised of a plurality of parabolic concave mirrors arranged so as to have common or the same focuses, respectively; a first light receiving section and a second light receiving section formed on the other side of the surface of the unit body divided by said partition wall, each of the first and second light receiving sections being a split concave mirror set comprised of a plurality of parabolic concave mirrors arranged so as to have common or the same focuses, respectively; a light shielding plate located vertically along the whole longitudinal length of said unit body at the substantially transverse central past thereof in such a manner as to divide the unit body into said first and second light projecting sections, and said first and second light receiving sections, respectively, said light shielding plate being fitted in the surface of the unit body as an integral part thereof at right angles to the side walls and the partition wall; a light projecting element mounting member mounted on said light shielding plate so as to locate a plurality of light projecting elements in the vicinity of each of the focuses of the split concave mirror sets in said light projecting section; and a light receiving element mounting member mounted on the light shielding plate so as to locate a plurality of light receiving elements in the vicinity of each of the focuses of the split concave mirror sets in said light receiving section.

5. The light projecting and receiving unit as claimed in claim 4, characterized in that each of the split concave mirror sets in said first light projecting section and said first light receiving section, respectively, consists of a combination of three parabolic concave mirrors arranged sequentially in the longitudinal direction of the unit body, and each of the central concave mirrors is formed to incline more sideways and outward than the two concave mirrors formed on both sides thereof.

6. The light projecting and receiving unit as claimed in claim 4, characterized in that each of the split concave mirror sets in said second light projecting section and said second light receiving section, respectively, consists of a combination of two parabolic concave mirrors arranged sequentially in the longitudinal direction of the unit body.

7. The light projecting and receiving unit as claimed in claim 4, characterized in that said unit body is made of aluminum, and each of the concave mirrors is formed by cutting the body into the predetermined shape and then subjecting it to a mirror surface finish.

8. The light projecting and receiving unit as claimed in claim 4, characterized in that said unit body is formed by molding ABS resin or acrylic resin, and each of the concave mirrors is formed by subjecting the surface of the molded unit body to vapor-deposition by an aluminium film.

9. The light projecting and receiving unit as claimed in claim 4, characterized in that the plurality of light projecting elements in said first light projecting section and the plurality of light projecting elements in said second light projecting section are provided independently so as to be turned ON and OFF independently.

* * * * *